United States Patent
Mizuta

[11] Patent Number: 5,905,903
[45] Date of Patent: May 18, 1999

[54] PC CARD FOR AN ISDN INTERFACE

[75] Inventor: Masaharu Mizuta, Tokyo, Japan

[73] Assignee: Mitsubishi Denki Kabushiki Kaisha, Tokyo, Japan

[21] Appl. No.: 08/802,817

[22] Filed: Feb. 19, 1997

[30] Foreign Application Priority Data

Sep. 5, 1996 [JP] Japan .................. P08-234941

[51] Int. Cl.⁶ .................................. G06F 15/00
[52] U.S. Cl. .................... 395/800.01; 395/800.32; 395/800.38
[58] Field of Search .................... 395/800.01, 800.32, 395/800.38

[56] References Cited

U.S. PATENT DOCUMENTS

| | | | |
|---|---|---|---|
| 5,210,741 | 5/1993 | Grochmal | 370/362 |
| 5,267,245 | 11/1993 | Maruyama et al. | 370/359 |
| 5,365,577 | 11/1994 | Davis et al. | 379/93.17 |
| 5,563,943 | 10/1996 | Takebayashi et al. | 379/373 |
| 5,638,373 | 6/1997 | Takebayashi et al. | 370/467 |

FOREIGN PATENT DOCUMENTS 4-217139  8/1992  Japan .

*Primary Examiner*—Eric Coleman
*Assistant Examiner*—Mackly Monestime

[57] ABSTRACT

ISDN-interface PC Card comprises a device connector for connecting a data processing device, a line connector for connecting a digital service unit (DSU), a controller for switching data sending and data receiving with the ISDN connected to the line connector and controlling the data communication conditions based on commands from the data processing device input through the device connector, a voice communication device connector for connecting a voice communication device, a connection detector for detecting connection of a voice communication device, and a data converter for coding and decoding the data input and output between the voice communication device and controller. When the connection detector detects that a voice communication device has been connected, the controller switches the ISDN line so that one ISDN B channel is used for data communication with the data processing device and the other B channel is used for voice communication.

10 Claims, 3 Drawing Sheets

PC CARD FOR AN ISDN INTERFACE

BACKGROUND OF THE INVENTION

1. Field of the Invention

The present invention relates to a PC Card providing the interface required to connect and use a personal computer or other data processing device to an Integrated Services Digital Network (ISDN) using digital communication lines.

2. Description of the Prior Art

PC Card type modems used with analog communication lines have become capable of increasingly faster transmission rates. Cards manufactured to current ITU-T (CCITT) Recommendations are capable of achieving a maximum 14.4 Kbps under the V.32bis protocol, 28.8 Kbps under V.34, and 33.6 Kbps under V.34bis. Some modems are also capable of simultaneous voice and data communication using a single telephone line by implementing the DSVD (Digital Simultaneous Voice and Data) or VOICE VIEW (registered trademark) modem protocols for simultaneous communication.

At the same time, however, increasing business and residential use of computers, and particularly the rapid spread of Internet access and use, have made even faster transmission of information, images, and audio essential. Applications such as television-conferencing in which data is transmitted by means of data communication protocols while teleconference participants simultaneously talk over a telephone connected to the same transmissions line to describe and discuss the transmitted data also necessitate communication means enabling simultaneous communication.

Communication means capable of both increasing the transmission rate and enabling simultaneous communication are currently available in the form of digital communication means connecting to an Integrated Services Digital Network (ISDN) rather than to conventional analog telephone lines.

The ISDN was designed and developed to efficiently transmit digitized signals from telephones, facsimile machines (faxes), personal computers, and other data sources at a high speed. More specifically, ISDN connections provide two so-called "B channels" each with a 64-Kbps transmission capacity and one "D channel" with a 16-Kbps transmission capacity. A single ISDN line connection provides the same communication capacity as two conventional analog lines. Using this ISDN connection, data can be transmitted at a sustained rate of either 64 Kbps or 128 Kbps by using one or both B channels, and a telephone conversation can be carried on while connected, for example, to the Internet or other network, or facsimiles can be sent and received during a personal computer data communication session.

One means of connecting and using a personal computer or other data processing device with an ISDN connection is an ISDN-interface PC Card conforming to the PCMCIA/JEIDA PC Card standard, hereinafter referred to as an ISDN card.

FIG. 4 is a simplified block diagram of a conventional ISDN card marketed, for example, by BUG Inc. under the brand name LINKBOY™ D64K. As shown in FIG. 4 the ISDN card 50 comprises a device connector 52 providing an interface conforming to the PCMCIA/JEIDA PC Card standard for connecting the ISDN card 50 to a personal computer or other data processing device 51; an interface circuit block 53 conforming to the PC Card standard; a controller 54 enabling the various ISDN card functions; memory 55 for storing firmware; S-point interface circuit 56, the interface circuit for the ISDN S-point providing the interface between the controller 54 and the external device connected to the ISDN card 50; an insulating I/O transformer 57; and a line connector 58 for connecting the ISDN digital service unit (DSU). Note that one of the connectors from the connector cable linking the ISDN card 50 with the DSU is connected to the line connector 58.

In this ISDN card 50 the device connector 52 is connected to the controller 54 through the interface circuit block 53. The controller 54 is connected to the memory 55 and to the S-point interface circuit 56. The S-point interface circuit 56 is connected through the I/O transformer 57 to the line connector 58.

Thus configured, the controller 54 operates in response to the send and receive commands input from the data processing device 51 through the device connector 52 and interface circuit block 53 based on the firmware stored to the memory 55 to implement high speed digital communication between the data processing device 51 and the ISDN connection at the 64 Kbps or 128 Kbps transmission rate enabled by ISDN.

Such conventional ISDN cards 50 are, however, designed for data communication using an ISDN connection. As a result, achieving simultaneous voice and data communication with this ISDN card 50 requires access to two communication lines, a digital ISDN line used by the ISDN card, and an analog line to which a telephone may be connected for talking.

SUMMARY OF THE INVENTION

An object of the present invention is therefore to resolve this problem by providing an ISDN card capable of high speed digital data communication simultaneously to voice communication using a telephone using only one ISDN subscriber line.

To achieve this object, the present invention is implemented as an ISDN-interface PC Card conforming to the PCMCIA/JEIDA PC Card standard and used to connect a data processing device to an ISDN subscriber line. More specifically, the ISDN-interface PC Card according to the present invention comprises a device connection means for connecting a data processing device; a line connection means for connecting an ISDN digital service unit (DSU); a control means for switching data sending and data receiving through the ISDN connection connected to the line connection means and controlling the data communication conditions based on commands from the data processing device input through the device connection means; a voice communication device connection means for connecting a voice communication device; a connection detecting means for detecting connection of a voice communication device to the voice communication device connection means; and a data conversion means for coding and decoding the data input and output between the control means and the voice communication device connected to the voice communication device connection means. When the connection detecting means detects that a voice communication device has been connected, the control means switches the ISDN line so that one ISDN B channel is used for data communication by the data processing device and the other B channel is used for conversation via the voice communication device.

When the connection detecting means does not detect that a voice communication device has been connected, the control means switches the ISDN line to use both ISDN B channels for data communication by the data processing device. More specifically, the voice communication device connection means is a jack for connecting a voice communication device, and the connection detecting means is a switch built in to the jack with the switch operating to change the open or closed position of the contacts when the voice communication device connector plug is inserted to and connected with said jack. The control means thus determines whether a voice communication device is connected based on the open or closed state of the contacts in the switch built-in to the jack.

The jack preferably has a low-profile stacking height shape, and the voice communication device is preferably an earphone-and-microphone set or the handset of a telephone.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of the present invention are described below with reference to the accompanying figures.
Embodiment 1

Figure 1:
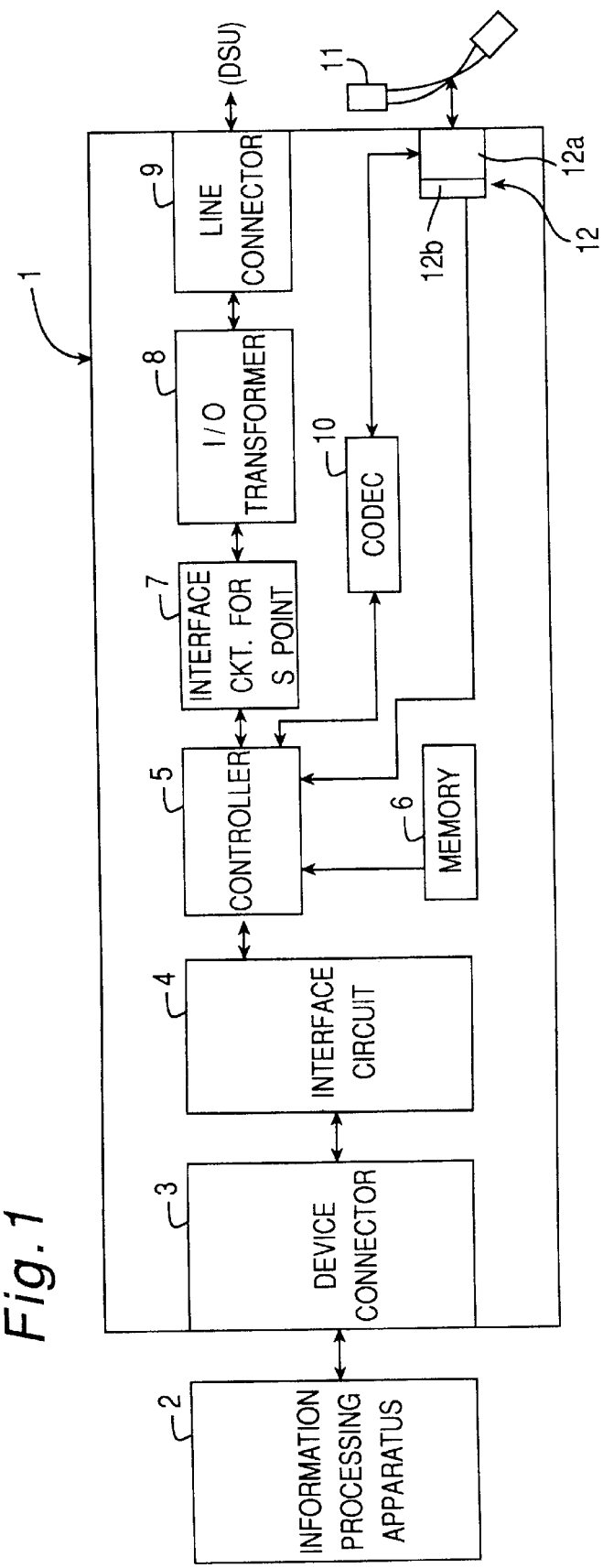
FIG. 1 is a simplified block diagram of an ISDN card according to the preferred embodiment of the present invention.

FIG. 1 is a block diagram of an ISDN card according to the first embodiment of the present invention.

As shown in FIG. 1, the ISDN card 1 comprises a device connector 3 providing an interface conforming to the PCMCIA/JEIDA PC Card standard for connecting the ISDN card 1 to a personal computer or other data processing device 2; an interface circuit block 4 conforming to the PC Card standard; a controller 5 enabling the various ISDN card functions; memory 6 for storing firmware; S-point interface circuit 7, the interface circuit 7 for the ISDN S-point providing the interface between the controller 5 and the external device connected to the ISDN card 1; an insulating I/O transformer 8; a line connector 9 for connecting the ISDN digital service unit (DSU); a codec 10 using, for example, the ADPCM coding method; and a jack 12 for connecting an earphone-and-microphone set 11.

Note that the line connector 9 and jack 12 are provided in the ISDN card 1 on the end opposite the device connector 3. Note, further, that the device connector 3 and interface circuit block 4 together constitute an example of device connection means, the controller 5 and memory 6 together constitute an example of control means, the interface circuit 7, I/O transformer 8, and line connector 9 together form an example of line connection means, the codec 10 constitutes an example of data conversion means, and the jack 12 constitutes an example of voice communication device connection means and connection detecting means.

In this ISDN card 1, the device connector 3 is connected to the controller 5 through the interface circuit block 4. The controller 5 is connected to the memory 6, to the S-point interface circuit 7, and to the codec 10. The S-point interface circuit 7 is connected through the I/O transformer 8 to the line connector 9. One of the connectors from the connector cable linking the ISDN card 1 with the DSU is connected to the line connector 9.

The jack 12 comprises a connector 12a for connecting the earphone-and-microphone set 11 to the codec 10, and a switch 12b used to detect whether the earphone-and-microphone set 11 is connected. The connector 12a is thus connected to the codec 10, and the switch 12b is connected to the controller 5.

It should be noted that the earphone-and-microphone set 11 is used in place of the handset of a conventional telephone. It comprises an earphone that is inserted to the outer ear, and a microphone disposed near the mouth. In addition, the connector 12a constitutes an example of voice communication device connection means, and the switch 12b constitutes an example of connection detecting means.

The connector 12a further comprises three contacts for the ground and the signals from the earphone and microphone in the earphone-and-microphone set 11. The switch constituting the switch 12b is built in to the jack 12.

Thus configured, the controller 5 operates in response to the send and receive commands input from the data processing device 2 through the device connector 3 and interface circuit block 4 based on the firmware stored to the memory 6, and thus controls the transmission rate and other communication conditions to enable high speed digital communication with the data processing device 2. The controller 5 also monitors the switched state of the switch 12b in the jack 12 to enable digital communication at 64 Kbps or 128 Kbps using both ISDN B channels when the plug of an earphone-and-microphone set 11 is not inserted to the jack 12.

When the plug of the earphone-and-microphone set 11 is inserted and connected to the jack 12, the controller 5 detects that the earphone-and-microphone set 11 is connected to the jack 12 by specifically detecting the position of the switch 12b, i.e., whether the switch contacts are closed and the switch 12b is thus on. If the switch 12b is on and an earphone-and-microphone set 11 is connected, the controller 5 switches one of the two ISDN B channels for digital data communication and the other B channel for voice communication through the codec 10 and earphone-and-microphone set 11. Note that while the present embodiment is described with the switch 12b contacts closing and the switching being on when the plug of the earphone-and-microphone set 11 is inserted to the jack 12, the same connection detection can be achieved with the switch contacts being open and the switch off when the plug of the earphone-and-microphone set 11 is inserted to the jack 12.

The codec 10 uses the ADPCM coding method to convert the analog signal input from the earphone-and-microphone set 11 connected to the jack 12 to a digital signal and outputs this digital signal to the controller 5. The codec 10 similarly converts the digital signal input from the ISDN connection through the controller 5 to an analog signal and outputs this analog signal to the earphone-and-microphone set 11 connected to the jack 12.

Note that the interface circuit block 4 and controller 5 can be achieved by means of the Motorola MC68PM302 chip, the S-point interface circuit 7 by means of the Motorola MC145574 chip, the I/O transformer 8 by means of the TDK S25 chip, and the codec 10 by means of the Motorola MC145480 codec.

The diameter of the plug for the earphone-and-microphone set 11 is 2.5 mm, resulting in an inside diameter of 2.6 mm for the hole in the jack 12 to which this plug is inserted. In a conventional jack the plug insertion hole is made, for example, from a 1 mm thick resin molding, resulting in a height of 4.6 mm. The ISDN card of the present invention, however, is a PC Card conforming to the PCMCIA/JEIDA PC Card standard, and the thickness of a Type II card is 5 mm. To incorporate this conventional jack in a PC Card requires a certain resin thickness above and below the jack, and this makes it impossible to provide such a jack in a Type II PC Card.

Figure 2:
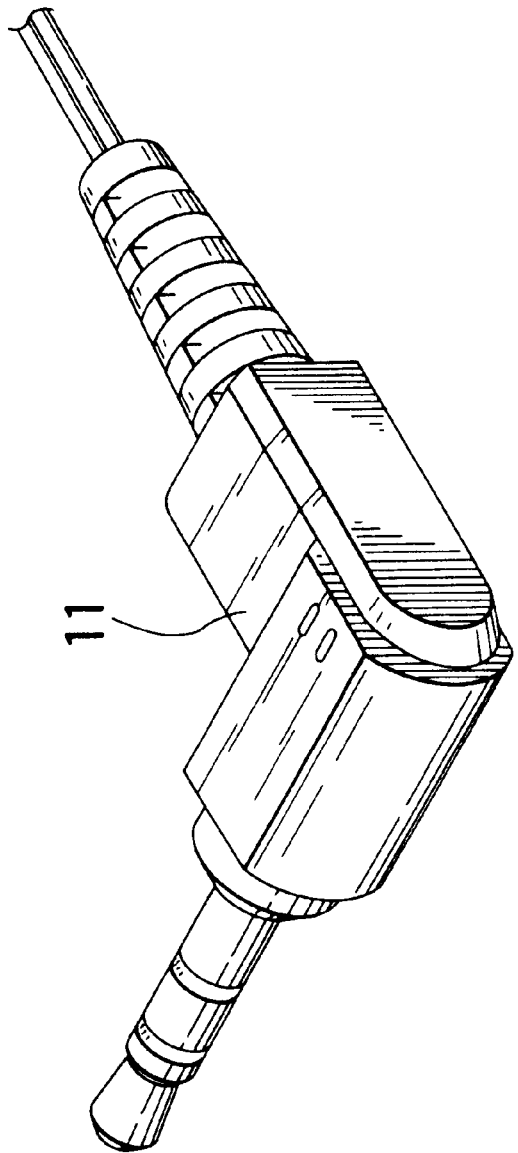
FIG. 2 is an oblique view of the jack 12 shown in FIG. 1.
Figure 2:
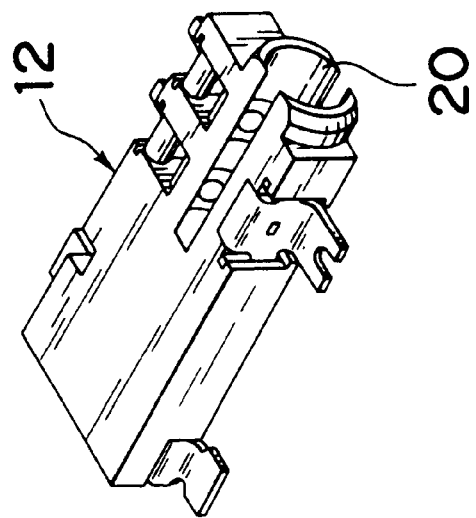
Figure 3:
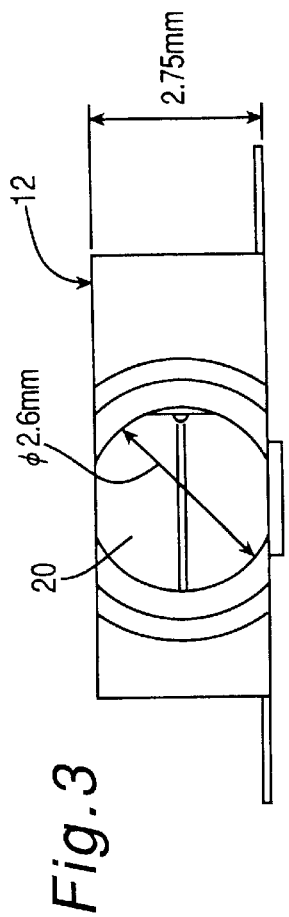
FIG. 3 is a cross section of the plug insertion hole in the jack 12 shown in FIG. 1.
Figure 4:
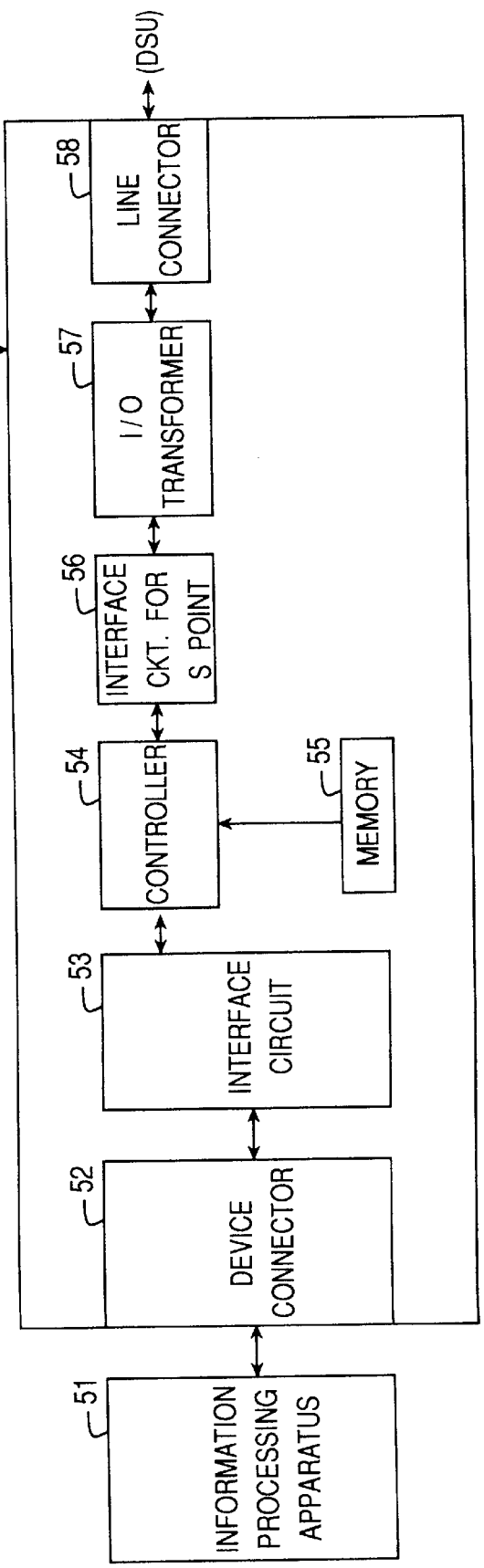
FIG. 4 is a simplified block diagram of a conventional ISDN card.

The jack 12 is therefore achieved in the ISDN-interface PC Card according to the present invention by trimming this 1 mm thick resin material forming the plug insertion hole in the thickness direction of the ISDN card 1, resulting in a jack height of 2.75 mm. This is illustrated in FIG. 2, an oblique view of the jack 12 used in the ISDN card 1 according to the preferred embodiment of the invention, and in FIG. 3, a cross section of the plug insertion hole in this jack 12. As shown in FIG. 2 and FIG. 3, the thickness of the 1 mm thick resin forming the plug insertion hole 20 of the jack 12 is cut so that the jack 12 will fit inside the ISDN card 1, thus achieving a low-profile stacking height jack 12 only 2.75 mm thick. As a result, the jack 12 can be provided in a Type II ISDN card 1 on the end opposite the device connector 3.

An ISDN card according to the preferred embodiment of the present invention thus provides on the end thereof opposite the device connector 3 a jack 12 for connecting the earphone-and-microphone set 11 and a line connector 9 for connecting to the ISDN DSU. When an earphone-and-microphone set 11 is not connected to the jack 12, the controller 5 functions to use both ISDN B channels for data communication at 64 or 128 Kbps. However, when an earphone-and-microphone set 11 is connected to the jack 12, the controller 5 functions to use one ISDN B channel for data communication while using the other B channel for voice communication by transmitting the voice data signal after analog/digital conversion by the codec 10. It is therefore possible to achieve simultaneous communication of both voice and data signals using a single ISDN subscriber line.

It should be noted that by using a low-profile stacking height jack 12, the ISDN card according to the preferred embodiment described above can be achieved in a Type II PC Card. The ISDN-interface PC Card of the present invention can therefore be used in a variety of Type II PC Card-compatible portable data processing devices not equipped with a Type III PC Card slot, and the practical utility of the invention is therefore increased.

Furthermore, while the above embodiment has been described by way of example only using an earphone-and-microphone set, the handset of a telephone can be used in place of this earphone-and-microphone set. The shape of the jack 12 in this case will differ.

As will be known from the above description of the preferred embodiment, an ISDN-interface PC Card according to the present invention disposes a line connection means for connecting to an ISDN DSU, and a voice communication device connection means for connecting, for example, an earphone-and-microphone set or the handset of a telephone, on the end opposite that to which the device connection means is disposed. When the control means determines from the detection result of the connection detecting means that a voice communication device is not connected to the voice communication device connection means, both ISDN B channels are used for data communication. However, when the control means determines that a voice communication device is connected to the voice communication device connection means, one ISDN B channel is used for data communication and the other B channels is used for voice communication via the voice communication device and the data conversion means.

More specifically, the voice communication device connection means may include a jack for connecting a voice communication device, and the connection detecting means may include a switch built in to the jack with the switch operating to change the open or closed position of the contacts when the voice communication device connector plug is inserted to and connected with the jack. The control means thus determines whether a voice communication device is connected based on the open or closed state of the contacts in the switch built in to the jack. It is therefore possible to achieve simultaneous voice and data communication over a single ISDN subscriber line.

By using a low-profile stacking height shape for the jack comprising the voice communication device connection means, the ISDN-interface PC Card of the present invention can be achieved in a Type II PC Card. As a result, the present invention can be used in a variety of portable data processing device not equipped with a Type III PC Card slot, and the practical utility of the invention is therefore increased.

Furthermore, by using a compact, lightweight, easy-to-carry earphone-and-microphone set as the voice communication device, it is easy to add a voice communication capability to such compact, lightweight, low-profile devices as PC Cards. The invention can therefore also greatly improve the practical utility of voice communication capabilities in notebook computers and other portable data processing devices.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An ISDN-interface PC Card conforming to the PCMCIA/JEIDA PC Card standard and used for connecting a data processing device to an Integrated Services Digital Network (ISDN) connection, comprising:

a device connector for connecting the PC Card to the data processing device;

a line connector for connecting the PC Card to an ISDN digital service unit (DSU);

a controller for switching data through the ISDN connection connected to said line connector, said controller controlling data communication conditions based on commands from the data processing device input through said device connector;

a voice communication device connector for connecting the PC Card to a voice communication device;

a connection detector for detecting when the voice communication device is connected to said voice communication device connector; and a data converter for coding and decoding the data input and output between said controller and said voice communication device when the voice communication device is connected to said voice communication device connector, wherein said controller switches the ISDN line so that one ISDN B channel is used for data communication by said data processing device and the other B channel is used for conversation via the voice communication device when said connection detector detects that the voice communication device is connected to said voice communication device connector, said controller switching the ISDN line regardless of whether a voice signal is present.

2. The ISDN-interface PC Card according to claim 1, wherein said controller switches the ISDN line to use both ISDN B channels for data communication by said data processing device when said connection detector detects that the voice communication device has been disconnected from said voice communication device connector.

3. The ISDN-interface PC Card according to claim 1, wherein said voice communication device connector is a jack for connecting the PC Card to the voice communication device, and said connection detector is a switch built into said jack, said switch operating to change a contact connection when a plug of said voice communication device is inserted into and connected with said jack.

4. The ISDN-interface PC Card according to claim 3, wherein said controller determines whether a voice communication device is connected based on the open or closed state of the contact connection in said switch built into said jack.

5. The ISDN-interface PC Card according to claim 3, wherein said jack has a low-profile stacking height shape.

6. The ISDN-interface PC Card according to claim 1, wherein the voice communication device is an earphone-and-microphone set.

7. The ISDN-interface PC Card according to claim 1, wherein the voice communication device is a handset of a telephone.

8. A method of controlling an ISDN interface that connects a data processing device to an ISDN network, comprising the steps of:

connecting the data processing unit to a first connector of the ISDN interface, connecting the ISDN interface to an ISDN digital service unit, routing data through the ISDN interface between the data processing device and the ISDN digital service unit, controlling data communication conditions based on commands received from the data processing device, providing a connector for a voice communication device, detecting whether the voice communication device is physically connected to the connector, and controlling the ISDN connection to communicate data signals with one ISDN B channel and to communicate voice signals with the other B channel when said detecting step detects that the voice communication device is physically connected to the connector, said controlling step controlling the ISDN connection regardless of whether a voice signal is present.

9. The method of controlling an ISDN interface according to claim 8, further comprising the step of:

controlling the ISDN connection to communicate data signals with both ISDN B channels when said detecting step detects that the voice communication device is physically disconnected from the connector.

10. The method of controlling an ISDN interface according to claim 8, further comprising the step of:

coding and decoding voice signals input and output between the voice communication device and the ISDN digital service unit.

* * * * *